US 12,192,673 B2

United States Patent
Choe et al.

(10) Patent No.: US 12,192,673 B2
(45) Date of Patent: Jan. 7, 2025

(54) ACCURATE OPTICAL FLOW INTERPOLATION OPTIMIZING BI-DIRECTIONAL CONSISTENCY AND TEMPORAL SMOOTHNESS

(71) Applicant: Samsung Electronics Co., Ltd., Suwon-si (KR)

(72) Inventors: Gyeongmin Choe, San Jose, CA (US); Yingmao Li, Allen, TX (US); John Seokjun Lee, Allen, TX (US); Hamid R. Sheikh, Allen, TX (US); Michael O. Polley, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 365 days.

(21) Appl. No.: 17/591,350

(22) Filed: Feb. 2, 2022

(65) Prior Publication Data

US 2022/0301184 A1  Sep. 22, 2022

Related U.S. Application Data

(60) Provisional application No. 63/161,899, filed on Mar. 16, 2021.

(51) Int. Cl.
*H04N 7/01* (2006.01)
*G06T 1/00* (2006.01)
(Continued)

(52) U.S. Cl.
CPC ......... *H04N 7/0137* (2013.01); *G06T 1/0021* (2013.01); *G06T 3/18* (2024.01);
(Continued)

(58) Field of Classification Search
None
See application file for complete search history.

(56) References Cited

U.S. PATENT DOCUMENTS 6,229,570 B1 * 5/2001 Bugwadia .............. H04N 7/014
348/459
8,259,198 B2 9/2012 Cote et al.
(Continued)

FOREIGN PATENT DOCUMENTS

CN    112488922 A    3/2021
KR    10-2201297 B1  1/2021
(Continued)

OTHER PUBLICATIONS

Altunbasak, Yucel, Russell M. Mersereau, and Andrew J. Patti. "A fast parametric motion estimation algorithm with illumination and lens distortion correction." IEEE Transactions on Image Processing 12.4 (2003): 395-408. (Year: 2003).*
(Continued)

*Primary Examiner* — Michelle M Entezari Hausmann

(57) ABSTRACT

A method includes obtaining multiple video frames. The method also includes determining whether a bi-directional optical flow between the multiple video frames satisfies an image quality criterion for bi-directional consistency. The method further includes identifying a non-linear curve based on pixel coordinate values from at least two of the video frames. The at least two video frames include first and second video frames. The method also includes generating interpolated video frames between the first and second video frames by applying non-linear interpolation based on the non-linear curve. In addition, the method includes outputting the interpolated video frames for presentation.

20 Claims, 8 Drawing Sheets

(51) Int. Cl.

| | | |
|---|---|---|
| *G06T 3/18* | (2024.01) | |
| *G06T 5/50* | (2006.01) | |
| *G06T 7/207* | (2017.01) | |
| *H04N 1/32* | (2006.01) | |
| *H04N 19/139* | (2014.01) | |
| *H04N 19/577* | (2014.01) | |

(52) U.S. Cl.
CPC ............... *G06T 5/50* (2013.01); *G06T 7/207* (2017.01); *H04N 1/32224* (2013.01); *H04N 19/139* (2014.11); *H04N 19/577* (2014.11); *G06T 2207/20221* (2013.01)

(56) References Cited

U.S. PATENT DOCUMENTS

| | | |
|---|---|---|
| 10,531,093 B2 | 1/2020 | Tang et al. |
| 10,733,783 B2 | 8/2020 | Machos et al. |
| 10,916,019 B2 | 2/2021 | Li |
| 10,958,869 B1 | 3/2021 | Chi et al. |
| 11,399,198 B1* | 7/2022 | Pourreza .............. H04N 19/513 |
| 2006/0193535 A1 | 8/2006 | Mishima et al. |
| 2009/0244389 A1 | 10/2009 | Mishima et al. |
| 2013/0071041 A1 | 3/2013 | Jin et al. |
| 2014/0002441 A1 | 1/2014 | Hung et al. |
| 2016/0278678 A1 | 9/2016 | Valdes et al. |
| 2017/0064204 A1 | 3/2017 | Sapiro et al. |
| 2017/0213319 A1 | 7/2017 | Kurihara et al. |
| 2018/0096464 A1 | 4/2018 | Kobayashi |
| 2018/0176574 A1 | 6/2018 | Tang et al. |
| 2019/0045223 A1 | 2/2019 | Levy et al. |
| 2019/0050998 A1* | 2/2019 | Kirby .................. H04N 13/239 |
| 2019/0057509 A1* | 2/2019 | Lv ............................. G06T 7/11 |
| 2020/0357099 A1 | 11/2020 | Long et al. |
| 2020/0394752 A1 | 12/2020 | Liu et al. |
| 2021/0027480 A1 | 1/2021 | Ren et al. |
| 2021/0067735 A1 | 3/2021 | Reda et al. |
| 2021/0144364 A1* | 5/2021 | Li ........................ H04N 19/105 |
| 2021/0176486 A1 | 6/2021 | Wang et al. |

FOREIGN PATENT DOCUMENTS

| | | |
|---|---|---|
| WO | 2019/040134 A1 | 2/2019 |
| WO | 2021093432 A1 | 5/2021 |

OTHER PUBLICATIONS

Yao Q, Liu Q, Dietterich TG, Todorovic S, Lin J, Diao G, Yang B, Tang J. Segmentation of touching insects based on optical flow and NCuts. biosystems engineering. Feb. 1, 2013;114(2):67-77. (Year: 2013).*

Choi, Jinsoo, Jaesik Park, and In So Kweon. "High-quality frame interpolation via tridirectional inference." Proceedings of the IEEE/CVF Winter Conference on Applications of Computer Vision. 2021. (Year: 2021).*

Liu, Shan, JongWon Kim, and C-C. Jay Kuo. "Nonlinear motion-compensated interpolation for low-bit-rate video." Applications of Digital Image Processing XXIII. vol. 4115. SPIE, 2000. (Year: 2000).*

Choe et al., "Pixel Blending for Synthesizing Video Frames with Occlusion and Watermark Handling," U.S. Appl. No. 17/591,040, filed Feb. 2, 2022, 49 pages.

International Search Report and Written Opinion of the International Searching Authority dated Jun. 23, 2022 in connection with International Patent Application No. PCT/KR2022/003606, 10 pages.

Non-Final Office Action dated Jun. 11, 2024 in connection with U.S. Appl. No. 17/591,040, 16 pages.

Reddy et al., "P2C2: Programmable pixel compressive camera for high speed imaging", IEEE Computer Vision and Pattern Recognition (CVPR), Jun. 2011, pp. 329-336.

* cited by examiner

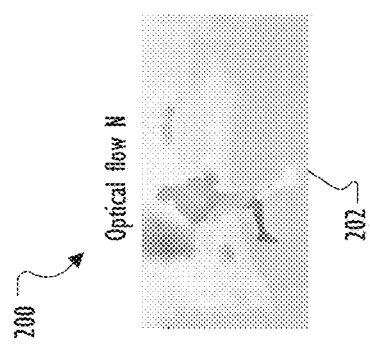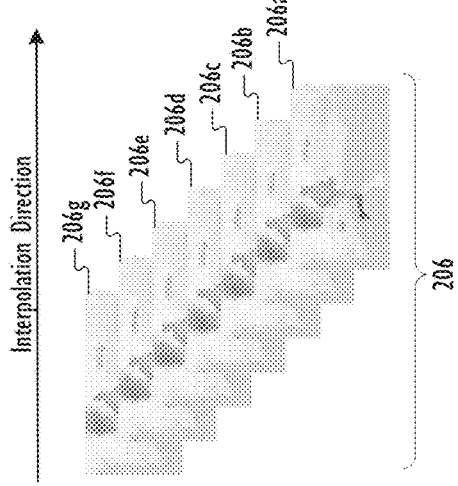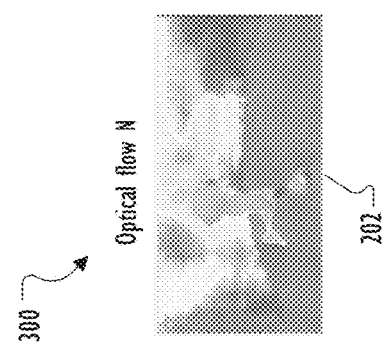

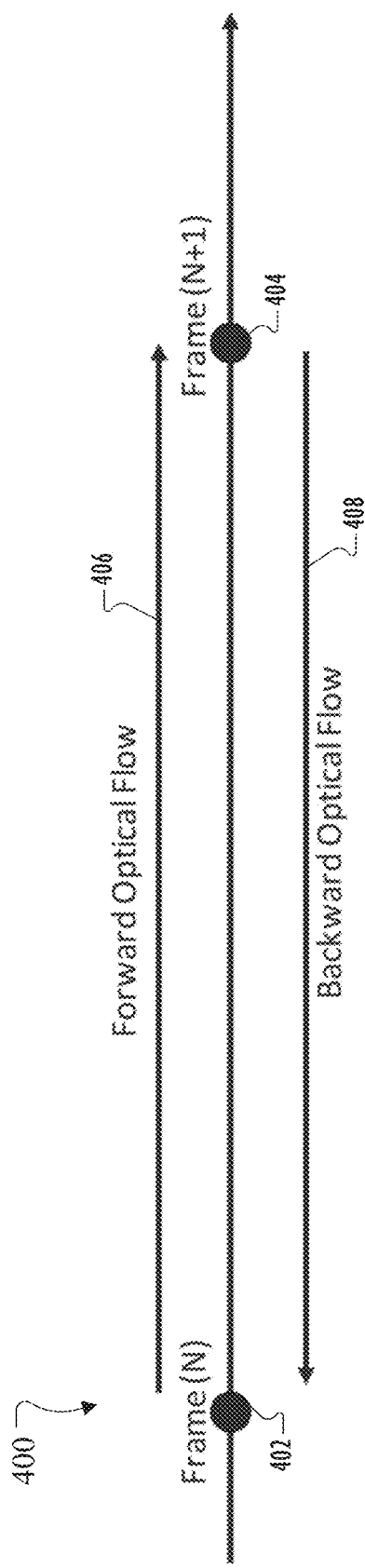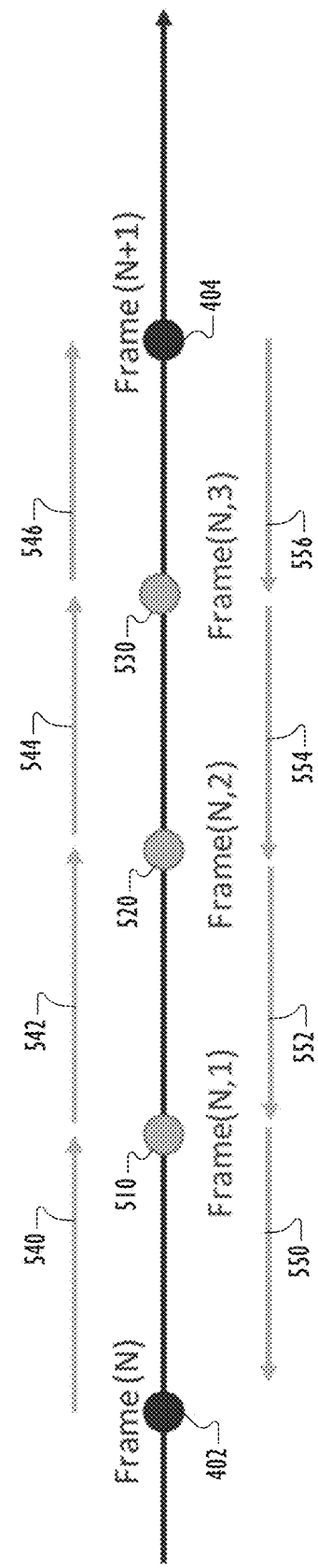

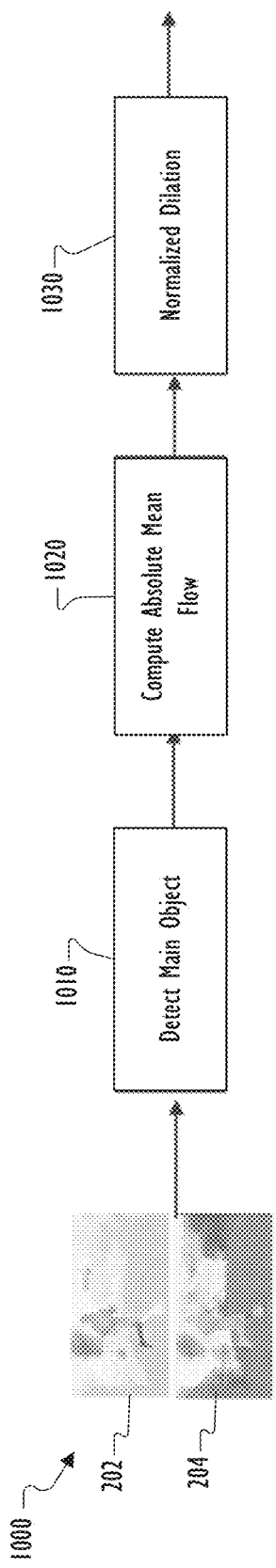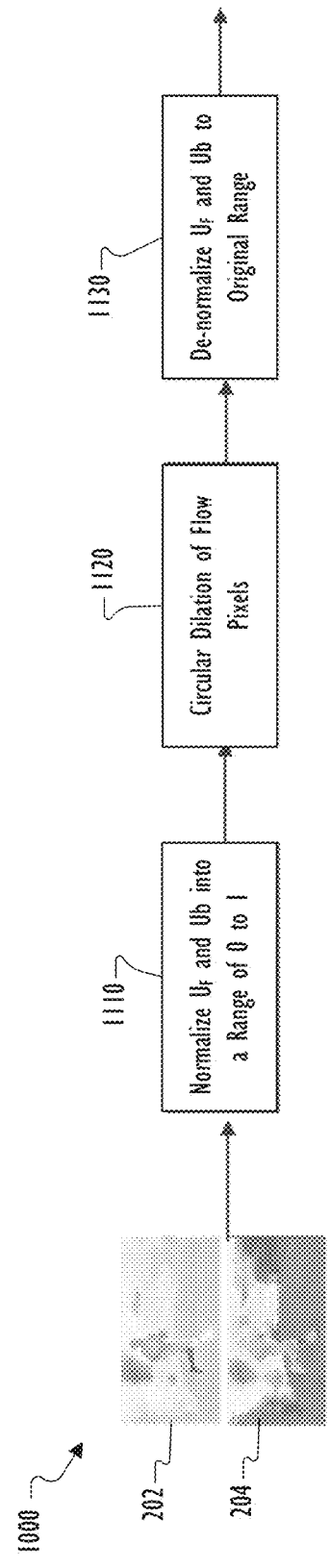
FIG. 10
FIG. 11

ACCURATE OPTICAL FLOW INTERPOLATION OPTIMIZING BI-DIRECTIONAL CONSISTENCY AND TEMPORAL SMOOTHNESS

CROSS-REFERENCE TO RELATED APPLICATION AND PRIORITY CLAIM

This application claims priority under 35 U.S.C. § 119 (e) to U.S. Provisional Pat. Application No. 63/161,899 filed on Mar. 16, 2021, which is hereby incorporated by reference in its entirety.

This application is related to U.S. Non-Provisional patent application Ser. No. 17/591,040 filed on Feb. 2, 2022, which is hereby incorporated by reference in its entirety.

TECHNICAL FIELD

This disclosure relates generally to image processing. More specifically, this disclosure relates to accurate optical flow interpolation optimizing bi-directional consistency and temporal smoothness.

BACKGROUND

With the popularity of mobile devices that include digital cameras, almost everyone can take a picture at any time. As the quality of the camera hardware in mobile devices has improved, users have begun to expect high-quality photographs from their devices. With recent developments in smartphone camera technology, one important smartphone camera function is video capture. With increasing demand to capture high-quality and interesting videos, slow motion video functions are gaining a lot of attention because they can capture very fast motion and moments in videos. However, the camera hardware in mobile devices still has significant limitations, such as poor slow-motion video quality of rapid motion.

SUMMARY

This disclosure relates to accurate optical flow interpolation optimizing bi-directional consistency and temporal smoothness.

In a first embodiment, a method includes obtaining multiple video frames. The method also includes determining whether a bi-directional optical flow between the multiple video frames satisfies an image quality criterion for bi-directional consistency. The method further includes identifying a non-linear curve based on pixel coordinate values from at least two of the video frames. The at least two video frames include first and second video frames. The method also includes generating interpolated video frames between the first and second video frames by applying non-linear interpolation based on the non-linear curve. In addition, the method includes outputting the interpolated video frames for presentation.

In a second embodiment, an electronic device includes at least one processing device configured to obtain multiple video frames. The at least one processing device is also configured to determine whether a bi-directional optical flow between the multiple video frames satisfies an image quality criterion for bi-directional consistency. The at least one processing device is further configured to identify a non-linear curve based on pixel coordinate values from at least two of the video frames. The at least two video frames include first and second video frames. The at least one processing device is also configured to generate interpolated video frames between the first and second video frames by applying non-linear interpolation based on the non-linear curve. In addition, the at least one processing device is configured to output the interpolated video frames for presentation.

In a third embodiment, a non-transitory computer readable medium contains instructions that when executed cause at least one processor of an electronic device to obtain multiple video frames. The instructions when executed also cause the at least one processor to determine whether a bi-directional optical flow between the multiple video frames satisfies an image quality criterion for bi-directional consistency. The instructions when executed further cause the at least one processor to identify a non-linear curve based on pixel coordinate values from at least two of the video frames. The at least two video frames include first and second video frames. The instructions when executed also cause the at least one processor to generate interpolated video frames between the first and second video frames by applying non-linear interpolation based on the non-linear curve. In addition, the instructions when executed cause the at least one processor to output the interpolated video frames for presentation.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a gaming console (such as an XBOX, PLAYSTATION, or NINTENDO), a smart speaker or speaker with an integrated digital assistant (such as SAMSUNG GALAXY HOME, APPLE HOMEPOD, or AMAZON ECHO), an electronic dictionary, an electronic key, a camcorder, or an electronic picture frame.

Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112 (f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112 (f).

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 illustrates an example forward multi-frame-based intermediate flow interpolation according to this disclosure;

FIG. 3 illustrates an example backward multi-frame-based intermediate flow interpolation according to this disclosure;

FIG. 4 illustrates an example bi-directional (forward/backward) flow interpolation according to this disclosure FIG. 5 illustrates an example forward/backward multi-frame-based intermediate flow interpolation according to this disclosure;

FIG. 10 illustrates an example normalized dilation operation according to this disclosure;

FIG. 11 illustrates an example normalized dilation operation according to this disclosure.

DETAILED DESCRIPTION

Figure 1:
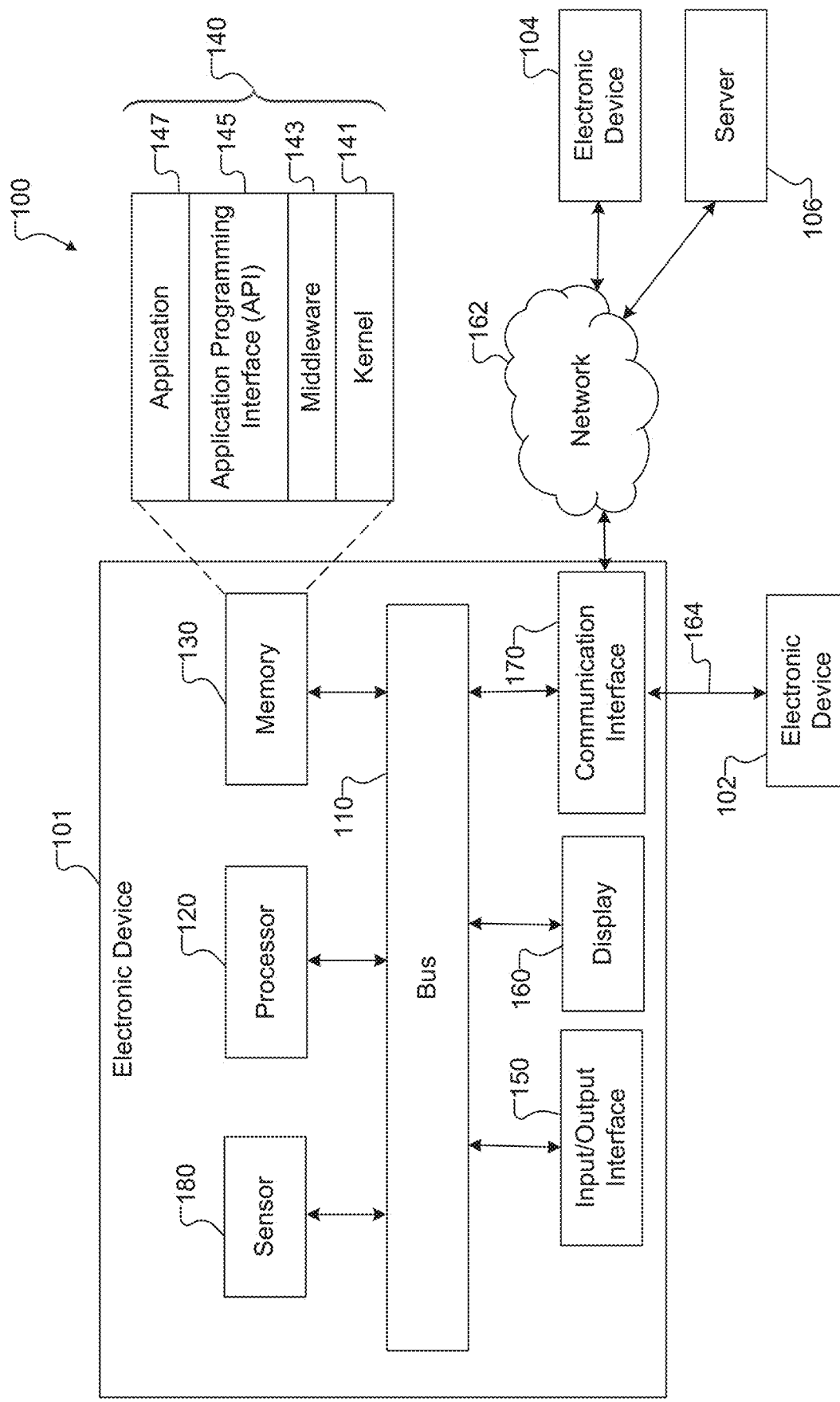
FIG. 1 illustrates an example network configuration including an electronic device according to this disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

As noted above, with the popularity of mobile devices that include digital cameras, almost everyone can take a picture at any time. As the quality of the camera hardware in mobile devices has improved, users have begun to expect high-quality photographs from their devices. With recent developments in smartphone camera technology, one important smartphone camera function is video capture. With increasing demand to capture high-quality and interesting videos, slow motion video functions are gaining a lot of attention because they can capture very fast motion and moments in videos. However, the camera hardware in mobile devices still has significant limitations, such as poor slow-motion video quality of rapid motion.

A digital camera of a smartphone is often capable of capturing image frames using still capture (in the case of photography) or video capture (in the case of videography). A common frame rate for video capture is 24 frames per second (FPS) or 30 FPS. A digital camera may also have a slow-motion video capture mode in which the frame rate is 30 FPS. When a user uses the digital camera to capture rapid motion, such as the motion of a jumping dog or a sprinting human, slow-motion playback of the rapid motion is not smooth and is choppy. For instance, the location of the jumping dog or the sprinting human from one captured image frame to the next captured image frame can be unpredictable.

This disclosure provides various techniques for performing interpolation of video frames in order to support operations such as slow motion video capture. As described in more detail below, multiple video frames can be obtained, and a non-linear curve can be identified based on pixel coordinate values from at least two of the video frames (where the at least two video frames include first and second video frames). Interpolated video frames can be generated by applying non-linear interpolation based on the non-linear curve, and the interpolated video frames can be output for presentation. Among other things, these techniques incorporate the use of bi-directional optical flows that are consistent with one another, which helps to avoid problems associated with forward and backward optical flows being inconsistent (which yields bad video synthesizing results). These techniques also support the use of multi-frame-based intermediate flow interpolation, which provides for improving smoothness of temporal video sequences. In addition, these techniques may support the use of optical flow post-processing with normalized dilation, which may be used to improve the quality of generated interpolated video frames (such as by reducing distortion artifacts and erosion artifacts of foreground and background pixels).

Note that while the functionality of this disclosure is often described with respect to use in mobile devices, such as to support slow motion or ultra-slow motion video playback, this functionality may be used in any other suitable devices and for any other suitable purposes. For instance, this functionality may be used to support high frame rate conversion in electronic devices like smart televisions, such as to convert videos from 60 FPS to 240 FPS. This functionality may also be used to process video content of services like NETFLIX, YOUTUBE, and HULU to enhance videos from lower frame rates to higher frame rates.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). In some cases, the processor 120 can receive video frame data captured by at least one imaging sensor and process the video frame data to perform accurate optical flow interpolation optimizing bi-directional consistency and temporal smoothness as described below.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for image processing (such as to perform accurate optical flow interpolation optimizing bi-directional consistency and temporal smoothness) as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors, which may be used to capture images of scenes (such as still image frames and sequences of video image frames). The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some cases, the server 106 can receive video frame data captured by at least one imaging sensor and process the video frame data to perform accurate optical flow interpolation optimizing bi-directional consistency and temporal smoothness as described below.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

FIG. 2 illustrates an example forward multi-frame-based intermediate flow interpolation 200 according to this disclosure. For ease of explanation, the flow interpolation 200 is described as being performed using one or more components of the electronic device 101 described above. However, this is merely one example, and the flow interpolation 200 could be performed using any other suitable device(s) and in any other suitable system(s), such as when performed using the server 106.

As shown in FIG. 2, the flow interpolation 200 involves the use of a reference video frame 202 and a subsequent video frame 204. For example, the reference frame 202 and the subsequent frame 204 may represent video frames that are captured by a sensor 180 of the electronic device 101. The reference frame 202 may be referred to as "frame N" or "optical flow N," and the subsequent frame 204 may be referred to as "frame N+1" or "optical flow N+1" (which indicates that the video frames 202 and 204 are consecutive or otherwise separated in time). In the example shown, the reference frame 202 and the subsequent frame 204 show a human sprinting in the foreground.

In some embodiments, the electronic device 101 may detect a request for a slow-motion playback of video frames or other request that involves interpolation of video frames. In response, the electronic device 101 may determine a playback speed (such as 2×, 4×, or 8× slower) and generate one or more interpolated video frames 206a-206g. The one or more interpolated video frames 206a-206g may be referred to as intermediate flows. The number of interpolated video frames 206a-206g generated may be based on the determined playback speed. For instance, the electronic device 101 may generate K interpolated video frames 206a-206g, where K is one less than the determined playback speed. In the example shown, based on the playback speed being determined as 8× slower, the electronic device 101 can generate seven interpolated video frames 206a-206g by performing forward optical flow interpolation.

Forward optical flow interpolation is a process that estimates pixel locations of image data in a subsequent frame based on the pixel locations of the image data in an earlier frame. For example, a pixel location can be represented by coordinates (x, y) in a frame, where the frame is an array of pixels. In this disclosure, frames can be indexed such that a reference frame is referred to as frame N, the subsequent frame is referred to as frame N+1, and a previous frame is referred to as frame N−1. Thus, in FIG. 2, the electronic device 101 receives the reference frame 202 and the subsequent frame 204 as inputs. Based on known pixel locations of image data in the frame 202 and in the frame 204, the electronic device 101 estimates pixel locations for image data in the interpolated video frames 206a-206g moving forward from the frame 202 to the frame 204. By generating the interpolated video frames 206a-206g, playback of the reference frame 202, the interpolated video frames 206a-206g, and the subsequent frame 204 provides a slow-motion effect since more frames are being played at a given rate.

FIG. 3 illustrates an example backward multi-frame-based intermediate flow interpolation 300 according to this disclosure. For case of explanation, the flow interpolation 300 is described as being performed using one or more components of the electronic device 101 described above. However, this is merely one example, and the flow interpolation 300 could be performed using any other suitable device(s) and in any other suitable system(s), such as when performed using the server 106.

As shown in FIG. 3, the flow interpolation 300 again involves the use of the reference video frame 202 and the subsequent video frame 204. In some embodiments, the electronic device 101 may detect a request for a slow-motion playback of video frames or other request that involves interpolation of video frames. In response, the electronic device 101 may determine a playback speed (such as 2×, 4×, or 8× slower) and generate one or more interpolated video frames 306a-306g. The one or more interpolated video frames 306a-306g may be referred to as intermediate flows. Again, the number of interpolated video frames 306a-306g generated may be based on the determined playback speed. For instance, the electronic device 101 may generate K interpolated video frames 306a-306g, where K is one less than the determined playback speed.

Backward optical flow interpolation is a process that estimates pixel locations of image data in an earlier frame based on the pixel locations of the image data in a subsequent frame. Thus, in FIG. 3, the electronic device 101 receives the reference frame 202 and the subsequent frame 204 as inputs. Based on known pixel locations of image data in the frame 202 and in the frame 204, the electronic device 101 estimates pixel locations for image data in the interpolated video frames 306a-306g moving backward from the frame 204 to the frame 202. By generating the interpolated video frames 306a-306g, playback of the reference frame 202, the interpolated video frames 306a-306g, and the subsequent frame 204 provides a slow-motion effect since more frames are being played at a given rate.

A standard interpolation technique is to simply and iteratively copy and paste one frame into timeslots that are intermediate between that frame and a subsequent frame. However, this produces movement that is not smooth. A bi-directional interpolation technique utilizes strong guidance (a strong indicator of knowing where pixels are going) in order to make interpolation easier. Bi-directional interpolation combines forward optical flow interpolation as shown in FIG. 2 and backward optical flow interpolation as shown in FIG. 3. The forward optical flow interpolation process estimates pixel locations in a subsequent frame based on known pixel locations in an earlier frame, and the backward optical flow interpolation process estimates pixel locations in an earlier frame based on known pixel locations in a subsequent frame.

FIG. 4 illustrates an example bi-directional (forward/backward) flow interpolation 400 according to this disclosure. As shown in FIG. 4, the electronic device 101 obtains multiple video frames, including frames 402 and 404 (which may represent the video frames 202 and 204 discussed above). The flow interpolation 400 here performs forward interpolation using a forward optical flow 406 and performs backward interpolation using a backward optical flow 408. The forward optical flow 406 is used to estimate pixel locations starting at the frame 402 and ending at the frame 404, and the backward optical flow 408 is used to estimate pixel locations starting at the frame 404 and ending at the frame 402.

Smoothness and sharpness are important image quality (IQ) criteria for video interpolation. Smoothness and sharpness of slow-motion video can be achieved when bi-directional consistency is met, which means that the forward optical flow 406 and backward optical flow 408 are consistent. Simply applying both forward and backward interpolation may not guarantee that the forward and backward optical flows are consistent, which can lead to poor video synthesizing results. The techniques described below help to ensure that the forward and backward optical flows are consistent, which leads to improved video synthesizing results.

Moreover, an optical flow interpolation that focuses on smoothness too much will cause a scene with a rapidly-moving object (such as a jumping dog or sprinting person) to play back in a choppy manner, in which case the rapidly-moving object looks blurry (less sharp). As a result, there can be a tradeoff between smoothness and sharpness. In some embodiments, the electronic device 101 may determine how much to focus on smoothness and how much to focus on sharpness based on one or more image quality criteria. In some cases, suitable smoothness and sharpness can be achieved when bi-directional consistency is met, which can be expressed as follows:

$$\operatorname{argmin}_{u_{0 \to 1}, u_{1 \to 0}} \|g(I_0; u_{0 \to i}) - g(I_1; u_{1 \to i})\|^2 \quad (1)$$

where $u_{0 \to i} = f(u_{0 \to 1}), u_{1 \to i} = f(u_{1 \to 0})$

The meanings of the variables shown in Equation (1) are described below with reference to FIG. 6.

FIG. 5 illustrates an example forward/backward multi-frame-based intermediate flow interpolation 500 according to this disclosure. For ease of explanation, the flow interpolation 500 is described as being performed using one or more components of the electronic device 101 described above. However, this is merely one example, and the flow interpolation 500 could be performed using any other suitable device(s) and in any other suitable system(s), such as when performed using the server 106.

In this example, forward and backward optical flows are used to support the interpolation of three interpolated frames 510, 520, and 530 between the video frames 402 and 404. This may allow, for instance, the electronic device 101 to support a 4× slow motion playback. Of course, other numbers of interpolated frames may be produced between the video frames 402 and 404 to support other slow motion playback speeds. In this example, the interpolated frames 510, 520, and 530 are generated using forward optical flows 540, 542, 544, and 546 and backward optical flows 550, 552, 554, and 556. The forward optical flows 540, 542, 544, and 546 of FIG. 5 can be the same as or similar to the optical flows used in FIG. 2, and the backward optical flows 550, 552, 554, and 556 of FIG. 5 can be the same as or similar to the optical flows used in FIG. 3. These optical flows can be consistent as described below so that the interpolated frames 510, 520, and 530 appear much more natural and avoid many of the issues with prior approaches.

Figure 6:
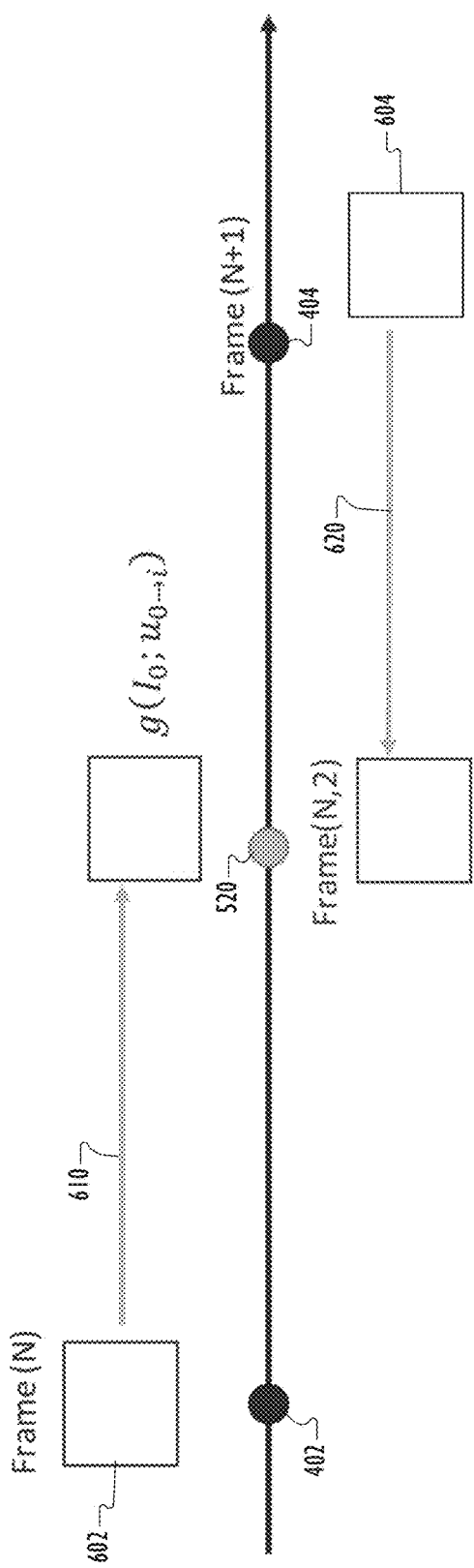
FIG. 6 illustrates an example determination of whether forward and backward optical flows are consistent or inconsistent according to this disclosure.

FIG. 6 illustrates an example determination of whether forward and backward optical flows are consistent or inconsistent according to this disclosure. For ease of explanation, this determination is described as being made using one or more components of the electronic device 101 described above. However, this is merely one example, and the determination could be made using any other suitable device(s) and in any other suitable system(s), such as when made by the server 106.

As shown in FIG. 6, the electronic device 101 is attempting to determine whether a forward optical flow 610 from the frame 402 to the interpolated frame 520 is matched or consistent with a backward optical flow 620 from the frame 404 to the interpolated frame 520. For example, the electronic device 101 may determine if the forward optical flow 610 (which can define changes of pixel locations from the frame 402 to the interpolated frame 520) results in the same or similar results as the backward optical flow 620 (which can define changes of pixel locations from the frame 404 to the interpolated frame 520). If the forward and backward optical flows 610 and 620 do not match, this may be indicated by significant pixel location differences determined using the optical flows 610 and 620.

Note that, in some embodiments, the electronic device 101 optimizes bi-directional optical flow consistency using a cost function. The cost function may accumulate costs determined for different pixels in the forward and backward directions, and the optical flows 610 and 620 can be adjusted to try to minimize the overall cost. This helps to make the optical flows 610 and 620 more consistent with one another. Using this or another approach, the electronic device 101 can help to prevent single-directional bias of flow vectors when identifying intermediate (interpolated) optical flows, prevent choppy transitions of interpolated video frames, and improve the temporal smoothness of interpolated optical flow maps and interpolated video frames.

In some cases, the forward optical flow 610 may be represented in the following manner:

$$g(I_0; u_{0 \to i}) \quad (2)$$

Here, $I_0$ represents an image 602 of the reference frame, $u_{0 \to i}$ represents the forward optical flow 610, and i represents a common intermediate coordinate. Similarly, in some cases, the backward optical flow 620 may be represented in the following manner:

$$g(I_1; u_{1 \to i}) \qquad (3)$$

Here, $I_1$ represents an image 604 of the subsequent frame, and $u_{1 \to i}$ represents the backward optical flow 620. As described above, Equation (1) can be used to minimize the error of computing the bi-directional optical flows 610 and 620 at the common intermediate coordinate i.

Figure 7:
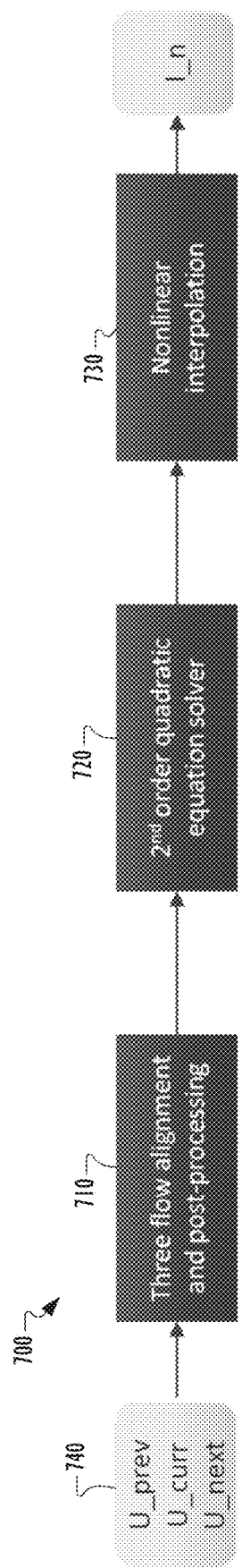
FIG. 7 illustrates an example multi-frame-based intermediate flow interpolation system according to this disclosure.

FIG. 7 illustrates an example multi-frame-based intermediate flow interpolation system 700 according to this disclosure. For ease of explanation, the interpolation system 700 is described as being implemented using one or more components of the electronic device 101 described above. However, this is merely one example, and the interpolation system 700 could be implemented using any other suitable device(s) and in any other suitable system(s), such as when performed using the server 106.

As shown in FIG. 7, the interpolation system 700 improves slow-motion or other interpolated image quality, such as in areas of frames where non-linear motion occurs between consecutive frames. In this example, the interpolation system 700 includes a three-flow alignment and post-processing function 710, an equation solver 720, and a non-linear interpolation function 730. The three-flow alignment and post-processing function 710 generally operates to align optical flows associated with input video frames 740 and fill in holes or other artifacts in the optical flows. Example operations of the alignment and post-processing function 710 are described below with reference to FIG. 8.

The equation solver 720 generally operates to identify linear, quadratic, cubic, or higher-order polynomial curves that define how the positions of pixels change between different video frames 740. For example, the equation solver 720 may receive data identifying how coordinates of certain pixels change between the captured video frames 740, and the equation solver 720 can perform a curve-fitting algorithm or other algorithm to generate one or more equations to represent how pixels move between the frames. Example operations of the equation solver 720 are described below with reference to FIG. 9.

The non-linear interpolation function 730 uses the one or more equations generated by the equation solver 720 to produce one or more interpolated frames 750. For example, the non-linear interpolation function 730 can use the one or more equations to estimate where various pixels contained in the video frames 740 would be located at one or more times between the capture of one video frame 740 and the capture of another video frame 740. These locations for the pixels can be used to generate the one or more interpolated frames 750. Example operations of the non-linear interpolation function 730 are also described below with reference to FIG. 9.

Figure 8:
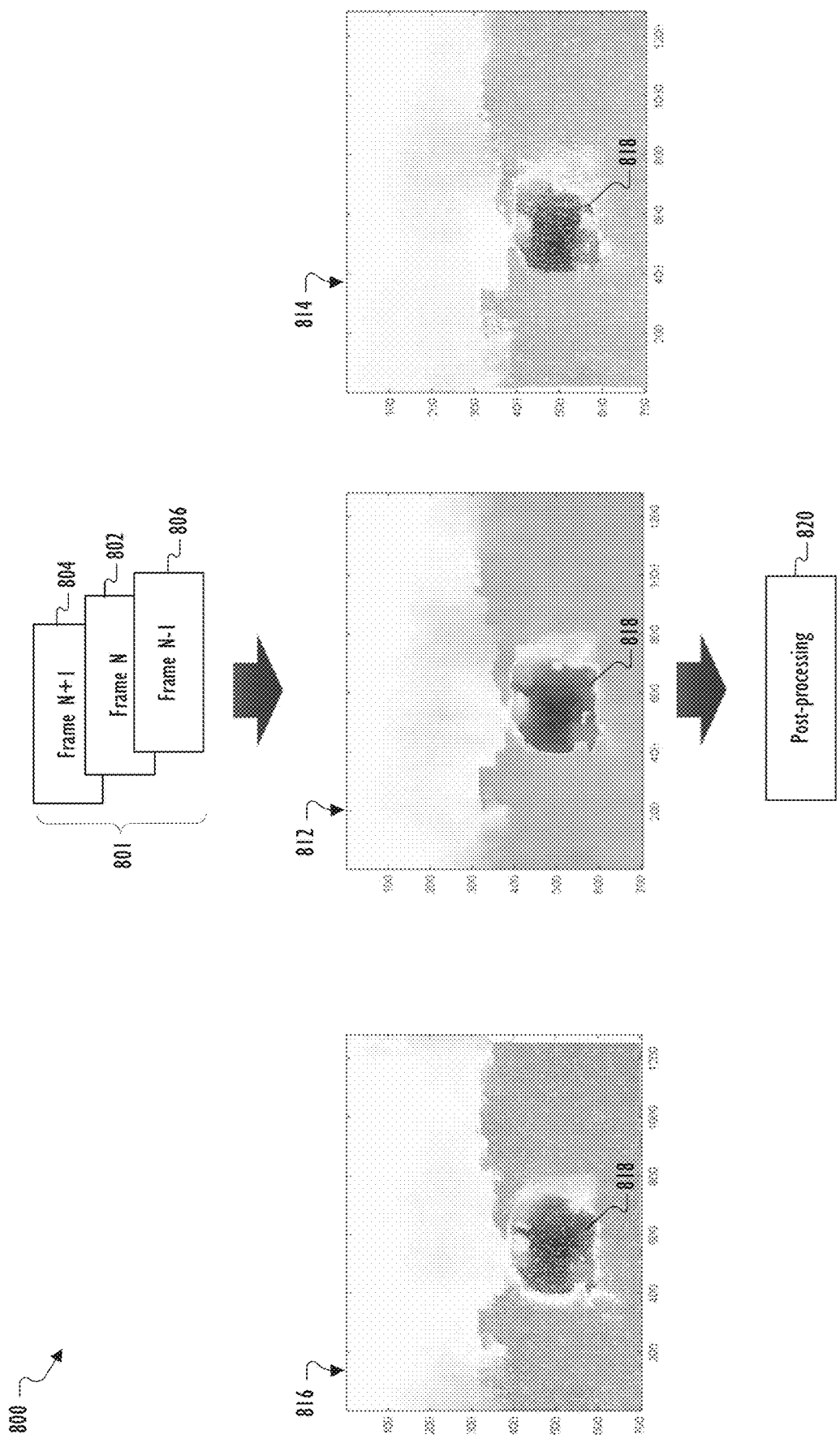
FIG. 8 illustrates an example alignment operation as part of a forward/backward multi-frame-based intermediate flow interpolation according to this disclosure.

FIG. 8 illustrates an example alignment operation 800 as part of a forward/backward multi-frame-based intermediate flow interpolation according to this disclosure. For ease of explanation, the alignment operation 800 is described as being performed using one or more components of the electronic device 101 described above. However, this is merely one example, and the alignment operation 800 could be performed using any other suitable device(s) and in any other suitable system(s), such as when performed using the server 106.

The alignment operation 800 is generally used to improve slow-motion or other interpolated image quality, such as in areas of frames where non-linear motion (like a jumping dog) occurs between neighboring frames. Examples of non-linear motion include rotation, morphological deformation, or abrupt flow direction changes. Using prior approaches, it is challenging to interpolate fast motion between a frame 802 and an earlier frame 804 or between the frame 802 and a subsequent frame 804, such as due to erosion artifacts. Also, when interpolation is applied to a fast-moving object captured in video, the fast-moving object tends to look smaller/shrunken compared to the actual size of the object. As an example of erosion artifacts, holes where pixels are missing can be seen in a visualization of an optical flow 816 from a previous frame N−1 to a current frame N, a visualization of an optical flow 812 from the current frame N to a subsequent frame N+1, and a visualization of an optical flow 816 from the subsequent frame N+1 to a next subsequent frame N+2. Such holes can be positioned in various locations throughout the optical flows 812, 814, and 816 or can be concentrated around a rapidly-moving object 818.

In the example shown here, the electronic device 101 performs the alignment operation 800 on a set 801 of frames, namely the frames 802, 804, and 806. In some cases, the alignment operation 800 can be considered a three-flow alignment operation, where alignment per frame is performed. By performing the alignment operation 800, the electronic device 101 is able to reduce erosion artifacts in the optical flows 812, 814, and 816. The optical flows 812, 814, and 816 provide examples of forward optical flows, but it should be understood that the alignment operation 800 is able to reduce erosion artifacts on backward optical flows that are estimated based on the same set of frames upon which the optical flows 812, 814, and 816 are estimated. After alignment has been corrected, the electronic device 101 proceeds to perform one or more post-processing operations 820. The post-processing operations 820 may include hole-filling or smoothing of any remaining erosion artifacts or other artifacts in the optical flows 812, 814, and 816. The post-processing operations 820 here can occur or be applied to three estimated bi-directional optical flows before operation of the equation solver 720 is applied to the three estimated bi-directional optical flows.

Figure 9:
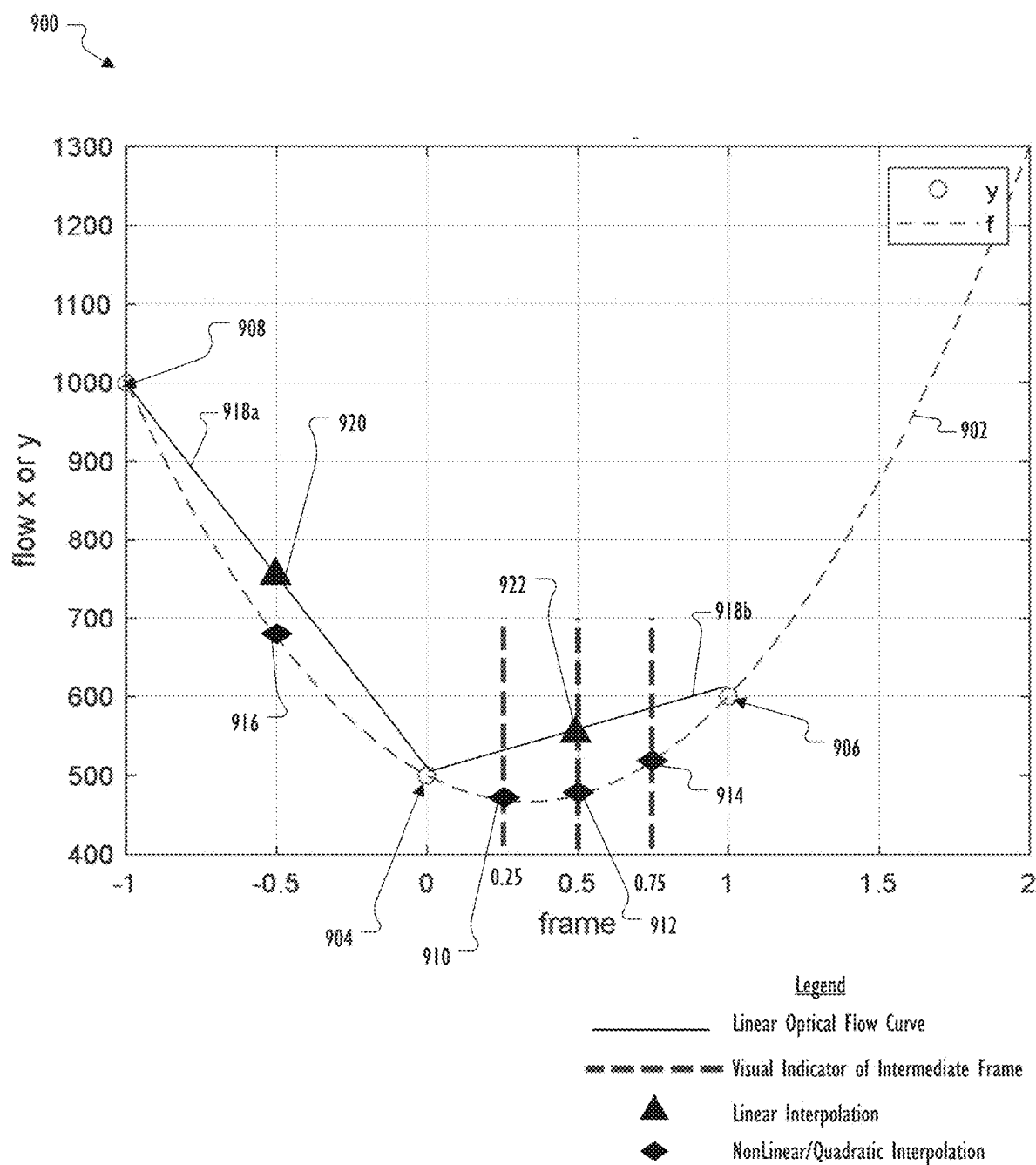
FIG. 9 illustrates an example pixel-wise fitting and frame interpolation operation according to this disclosure.

FIG. 9 illustrates an example pixel-wise fitting and frame interpolation operation according to this disclosure. For ease of explanation, the pixel-wise fitting and frame interpolation operation is described as being performed using one or more components of the electronic device 101 described above. However, this is merely one example, and the pixel-wise fitting and frame interpolation operation could be performed using any other suitable device(s) and in any other suitable system(s), such as when performed using the server 106.

As shown in FIG. 9, the electronic device 101 may include or use a quadratic equation solver (QES) or other multi-order polynomial solver. As noted above, the pixel location of each pixel of a frame has an x-coordinate and a y-coordinate, which can be expressed as (x, y). The solver may operate to generate a graph 900 of a flow curve 902, where the horizontal axis of the graph 900 represents a frame number relative to the reference frame and the vertical axis of the graph 900 represents the value of the x-coordinate or the value of the y-coordinate of pixels. On the horizontal axis, the reference frame is represented by a value of 0, the subsequent frame is represented by a value of +1, the frame after that is represented by a value of +2, and the previous frame is represented by a value of −1. Interpolated frames may be represented using fractional values, such as 0.25, 0.5, and 0.75. Effectively, the graph 900 represents where different pixels of the reference frame may be located in other frames. Note that while a quadratic equation solver (which can be used to solve a quadratic equation representing optical flow) is described here, other solvers may be used, such as solvers used to solve cubic flow curves or other multi-order polynomial curves representing optical flow. To avoid duplication, the discussion below may focus on the use of y coordinates in the graph 900, although analogous operations may be performed for the x coordinates.

To generate the flow curve 902 for a particular pixel, the pixel location (x, y) of that particular pixel can be identified in the various frames, and the respective values of its y coordinate are plotted (such as at points 904, 906, and 908). The solver here can solve for a quadratic equation f( ) that approximately represents the flow curve 902 that fits the pixel movements represented by the points 904, 906, and 908. Again, note that the use of a quadratic curve is for illustration only and that other curves may be used.

Using the determined flow curve 902, the electronic device 101 may perform interpolations to generate one or more interpolated frames between two or more input frames. For example, in the case of a playback speed of 4×, the electronic device 101 generates three interpolated intermediate frames, which may be denoted as frame N+0.25, frame N+0.5, and frame N+0.75. The electronic device 101 can determine the y coordinate values of the interpolated intermediate frame N+0.25 by plotting a non-linear interpolation point 910 where the flow curve 902 intersects the corresponding frame value of 0.25. In a similar manner, non-linear interpolation points 912, 914, and 916 can be plotted on the flow curve 902 to represent the determined y coordinate values of frame N+0.5, frame N+0.75, and frame N−0.5, respectively. In some cases, the electronic device 101 may perform interpolations using a quadratic flow curve 902.

Again, note that the electronic device 101 is not limited to performing pixel-wise fitting and frame interpolation using a quadratic flow curve. In other embodiments, other non-linear curves can be applied, such as a cubic flow curve or other higher-order polynomial curve. Also, in some embodiments, the electronic device 101 may utilize linear curves 918a and 918b that respectively correspond to linear relationships between frame N and frame N−1 and between frame N and frame N+1. Linear interpolation points 920 and 922 represent y coordinate values of frame N−0.5 and frame N+0.5, respectively. Note that a higher-order curve, such as a cubic flow curve, may produce a smoother video than the quadratic flow curve 902. A lower-order curve, such as the linear flow curves 918a and 918b, may produce a video that is less smooth than the quadratic flow curve 902 but which can be computed more quickly.

FIG. 10 illustrates an example normalized dilation operation 1000 according to this disclosure. For ease of explanation, the operation 1000 is described as being performed using one or more components of the electronic device 101 described above. However, this is merely one example, and the operation 1000 could be performed using any other suitable device(s) and in any other suitable system(s), such as when performed using the server 106.

Although optical flow interpolation/estimation can yield highly-accurate forward and backward optical flow results, the optical flow is not always perfectly accurate, and motion boundaries of optical flow maps are often not strictly aligned with input frames (such as the frames 202 and 204 of FIGS. 2 and 3, the frames 402 and 404 of FIG. 4, or the frames 802-806 of FIG. 8). Erosion artifacts occur when a flow boundary is inside of motion boundary, which is a condition that often causes noticeable boundary artifacts within a specified object in a frame. The specified object here may refer to a fast-moving object or an object in the foreground. To help compensate for possible imperfect optical flow boundaries for video interpolation, the electronic device 101 can perform the operation 1000.

As shown in FIG. 10, in operation 1010, the electronic device 101 detects a main object in received input frames 202 and 204. The main object represents the object where the largest motion is happening between the input frames. In some embodiments, AI/ML-based optical flow maps may be used to more accurately wrap (or enclose a boundary around) the main object. In some cases, the main object may be a fast-moving object. In operation 1020, the electronic device 101 determines absolute mean flows of a main object blob and a background blob. In some embodiments, the electronic device 101 separates the background of the input images from the main object, such as by using a layer separation technique in combination with calculating a motion difference. The absolute mean flow of the main object blob may represent the general direction of movement of the main object in the frames, and the absolute mean flow of the background blob may represent the general direction of movement of the background in the frames. In operation 1030, the electronic device 101 applies a normalized dilation of pixels so that the flow boundary of the main object will fully wrap the motion boundary of the main object. Dilation generally involves expanding pixels around a fast-moving object (such as a boundary of a car) so that, in interpolated frames, the fast-moving object appears to be normal-sized or have a size that is suitably close to normal (rather than shrunken). In some embodiments, operation 1030 includes applying the process of FIG. 11.

FIG. 11 illustrates an example normalized dilation operation 1100 according to this disclosure. For ease of explanation, the operation 1100 is described as being performed using one or more components of the electronic device 101 described above. However, this is merely one example, and the operation 1100 could be performed using any other suitable device(s) and in any other suitable system(s), such as when performed using the server 106.

Incorrect flow vectors for motion boundaries often yield noticeable boundary artifacts for main objects in frames. To compensate for this, the electronic device 101 can utilize a normalized dilation to process optical flow maps. For example, the electronic device 101 may process a raw optical flow map and cluster pixels by applying a clustering algorithm (such as a K-means clustering algorithm). After detecting the layer with the largest motion, the electronic device 101 applies image dilation to its flow vectors so that the layer with the largest motion can fully wrap the motion boundaries of an object. Each (x, y) component of a flow vector can be separately dilated, and the results can be concatenated afterwards. For example, the x axis and the y axis may undergo separate normalized dilation operations.

In operation 1110, the electronic device 101 normalizes a flow vector into a range of zero to one from an original range. For example, the electronic device 101 may normalize each of a forward flow vector $U_F$ and a backward flow vector $U_B$ into the range of zero to one. Here, optical flow may be defined as pixel displacement between neighboring frames, so the entire frame's optical flow can be normalized in this range. In operation 1120, the electronic device 101 performs dilation, such as circular dilation, of flow pixels. For example, for optical flow values around the boundary of a fast-moving object, a circular or other dilation kernel can be applied to expand or increase pixel sizes. In operation 1130, the electronic device 101 de-normalizes the flow vector or converts the flow vector back to its original range. For example, the electronic device 101 may convert the forward flow vector $U_F$ and the backward flow vector $U_B$ back to their original flow ranges. De-normalizing enables the electronic device 101 to use the same dilation kernel size for each frame and scene. This makes the entire post-processing less complex. In some embodiments, because optical flows of the boundaries of fast-moving objects have been increased, the electronic device 101 may normalizes again (by repeating operations 1110-1130) so that the final optical flow range is between one and zero and then de-normalized back to the original range.

Figure 12:
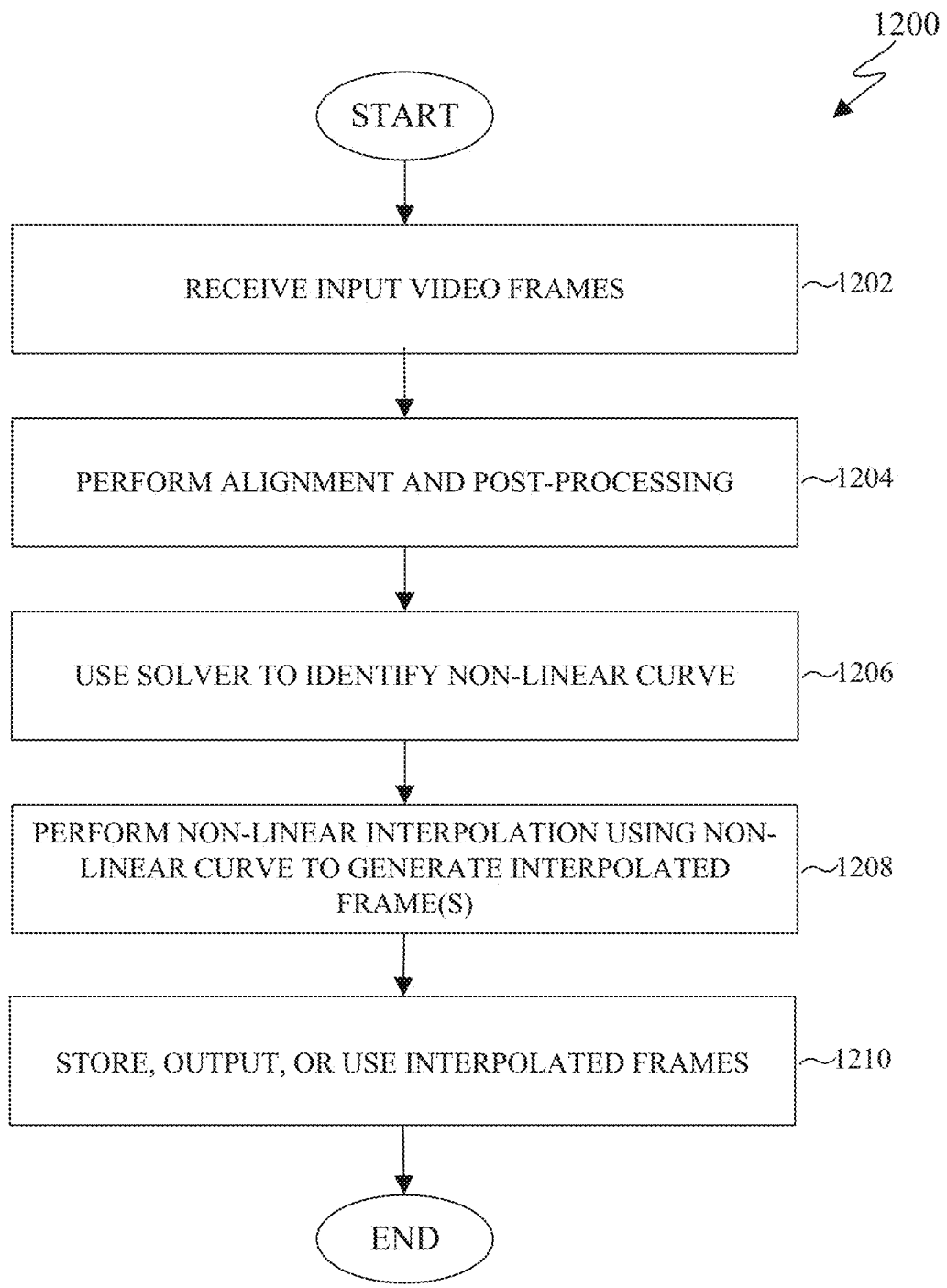
FIG. 12 illustrates an example method for accurate optical flow interpolation optimizing bi-directional consistency and temporal smoothness according to this disclosure.

FIG. 12 illustrates an example method 1200 for accurate optical flow interpolation optimizing bi-directional consistency and temporal smoothness according to this disclosure. For ease of explanation, the method 1200 is described as being performed using one or more components of the electronic device 101 described above. However, this is merely one example, and the method 1200 could be performed using any other suitable device(s) and in any other suitable system(s), such as when performed using the server 106.

As shown in FIG. 12, in operation 1202, the processor 120 receives inputs that include multiple video frames. In this example, the processor 120 receives three video frames. Note, however, that the processor 120 may receive two video frames or more than three video frames. In operation 1204, the processor 120 performs alignment and post-processing of the video frames. This may include, for example, the processor 120 performing the alignment operation 800 and the one or more post-processing operations 820.

In operation 1206, the processor 120 utilizes a solver (such as a QES) to generate one or more non-linear curves that fit the pixel values of the video frames. In operation 1208, the processor 120 generates one or more interpolated video frames by applying non-linear interpolation using the non-linear curve(s). In operation 1210, the processor 120 may store, output, or use the interpolated video frames. In some embodiments, the interpolated video frames may be provided to a display device, such as the display 160.

It should be noted that the functions shown in or described with respect to FIGS. 2 through 12 can be implemented in an electronic device 101, server 106, or other device in any suitable manner. For example, in some embodiments, at least some of the functions shown in or described with respect to FIGS. 2 through 12 can be implemented or supported using one or more software applications or other software instructions that are executed by the processor 120 of the electronic device 101, server 106, or other device. In other embodiments, at least some of the functions shown in or described with respect to FIGS. 2 through 12 can be implemented or supported using dedicated hardware components. In general, the functions shown in or described with respect to FIGS. 2 through 12 can be performed using any suitable hardware or any suitable combination of hardware and software/firmware instructions.

Although FIGS. 2 through 12 have illustrated various examples of features and functions used to provide accurate optical flow interpolation optimizing bi-directional consistency and temporal smoothness, various changes may be made to FIGS. 2 through 12. For example, various functions described above may be combined, further subdivided, replicated, omitted, or rearranged and additional functions may be added according to particular needs. Also, various images and graphs are shown to illustrate example types of information that may be received or generated. However, images of scenes can vary widely, and the images received or generated and the graphs associated with the images can also vary widely. In addition, while FIG. 12 shows a series of steps, various steps in FIG. 12 could overlap, occur in parallel, occur in a different order, or occur multiple times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
obtaining multiple video frames;
determining whether a bi-directional optical flow between the multiple video frames satisfies an image quality criterion for bi-directional consistency;
identifying a non-linear curve based on pixel coordinate values from at least two of the video frames, the at least two video frames comprising first and second video frames;
generating interpolated video frames between the first and second video frames by applying non-linear interpolation based on the non-linear curve; and
outputting the interpolated video frames for presentation.

2. The method of claim 1, wherein generating the interpolated video frames comprises:
generating an intermediate interpolated frame between the first and second video frames; and
determining an intermediate bi-directional optical flow corresponding to the intermediate interpolated frame, the intermediate bi-directional optical flow including:
a forward optical flow from the first video frame to the intermediate interpolated frame; and
a backward optical flow from the second video frame to the intermediate interpolated frame.

3. The method of claim 2, further comprising:
ensuring that the forward optical flow is substantially consistent with the backward optical flow.

4. The method of claim 1, wherein the non-linear curve comprises a multi-order polynomial.

5. The method of claim 1, further comprising:
aligning optical flows associated with the video frames prior to identification of the non-linear curve.

6. The method of claim 1, further comprising:
performing post-processing of optical flows used to generate the interpolated video frames.

7. The method of claim 6, wherein generating the interpolated video frames comprises:
detecting a specified object in the video frames;
identifying absolute mean flows of a specified object blob and a background blob; and
applying a normalized dilation to one component of an optical flow vector and separately applying the normalized dilation to another component of the optical flow vector.

8. An electronic device comprising:
at least one processing device configured to:
obtain multiple video frames;
determine whether a bi-directional optical flow between the multiple video frames satisfies an image quality criterion for bi-directional consistency;

identify a non-linear curve based on pixel coordinate values from at least two of the video frames, the at least two video frames comprising first and second video frames;

generate interpolated video frames between the first and second video frames by applying non-linear interpolation based on the non-linear curve; and output the interpolated video frames for presentation.

9. The electronic device of claim 8, wherein, to generate the interpolated video frames, the at least one processing device is configured to:

generate an intermediate interpolated frame between the first and second video frames; and determine an intermediate bi-directional optical flow corresponding to the intermediate interpolated frame, the intermediate bi-directional optical flow including:

a forward optical flow from the first video frame to the intermediate interpolated frame; and a backward optical flow from the second video frame to the intermediate interpolated frame.

10. The electronic device of claim 9, wherein the at least one processing device is further configured to ensure that the forward optical flow is substantially consistent with the backward optical flow.

11. The electronic device of claim 8, wherein the non-linear curve comprises a multi-order polynomial.

12. The electronic device of claim 8, wherein the at least one processing device is further configured to align optical flows associated with the video frames prior to identification of the non-linear curve.

13. The electronic device of claim 8, wherein the at least one processing device is further configured to perform post-processing of optical flows used to generate the interpolated video frames.

14. The electronic device of claim 13, wherein, to generate the interpolated video frames, the at least one processing device is configured to:

detect a specified object in the video frames;

identify absolute mean flows of a specified object blob and a background blob; and apply a normalized dilation to one component of an optical flow vector and separately apply the normalized dilation to another component of the optical flow vector.

15. A non-transitory computer readable medium contains instructions that when executed cause at least one processor of an electronic device to:

obtain multiple video frames;

determine whether a bi-directional optical flow between the multiple video frames satisfies an image quality criterion for bi-directional consistency;

identify a non-linear curve based on pixel coordinate values from at least two of the video frames, the at least two video frames comprising first and second video frames;

generate interpolated video frames between the first and second video frames by applying non-linear interpolation based on the non-linear curve; and output the interpolated video frames for presentation.

16. The non-transitory computer readable medium of claim 15, wherein the instructions that when executed cause the at least one processor to generate the interpolated video frames comprise instructions that when executed cause the at least one processor to:

generate an intermediate interpolated frame between the first and second video frames; and determine an intermediate bi-directional optical flow corresponding to the intermediate interpolated frame, the intermediate bi-directional optical flow including:

a forward optical flow from the first video frame to the intermediate interpolated frame; and a backward optical flow from the second video frame to the intermediate interpolated frame.

17. The non-transitory computer readable medium of claim 16, further containing instructions that when executed cause the at least one processor to ensure that the forward optical flow is substantially consistent with the backward optical flow.

18. The non-transitory computer readable medium of claim 15, wherein the non-linear curve comprises a multi-order polynomial.

19. The non-transitory computer readable medium of claim 15, further containing instructions that when executed cause the at least one processor to perform post-processing of optical flows used to generate the interpolated video frames.

20. The non-transitory computer readable medium of claim 19, wherein the instructions that when executed cause the at least one processor to generate the interpolated video frames comprise instructions that when executed cause the at least one processor to:

detect a specified object in the video frames;

identify absolute mean flows of a specified object blob and a background blob; and apply a normalized dilation to one component of an optical flow vector and separately apply the normalized dilation to another component of the optical flow vector.

* * * * *